United States Patent [19]
Ashok et al.

[11] Patent Number: 5,815,351
[45] Date of Patent: Sep. 29, 1998

[54] OVERLOAD PROTECTION CIRCUIT USING A NO-TRIM CIRCUIT FOR COMPUTER POWER SUPPLIES

[75] Inventors: Gerard Ashok, Austin; Fred M. Henegar, Georgetown, both of Tex.

[73] Assignee: Dell Computer Corporation, Round Rock, Tex.

[21] Appl. No.: 897,770

[22] Filed: Jul. 21, 1997

[51] Int. Cl.[6] .................................................. H02H 7/00
[52] U.S. Cl. .............................. 361/18; 361/86; 361/106
[58] Field of Search .................................. 361/18, 86, 91, 361/78–79, 106; 363/50–53; 364/481, 483

[56] References Cited

U.S. PATENT DOCUMENTS

| | | | |
|---|---|---|---|
| 4,467,386 | 8/1984 | Wasson | 361/106 |
| 4,614,906 | 9/1986 | Maxham | 323/267 |
| 5,309,309 | 5/1994 | Weber | 361/18 |
| 5,465,188 | 11/1995 | Pryor et al. | 361/18 |
| 5,640,059 | 6/1997 | Kammiller et al. | 370/66 |

*Primary Examiner*—Jeffrey A. Gaffin
*Assistant Examiner*—Michael J. Sherry
*Attorney, Agent, or Firm*—Haynes and Boone, L.L.P.

[57] ABSTRACT

In a computer, an overload protection circuit for protecting the computer's power supply from overload over a wide ambient temperature range. The overload protection circuit, which compares two voltage signals in order to shut off the computer power supply when certain limits are exceeded, is implemented without any pots or other trim circuits. Instead, a resistive temperature device is utilized to counter the effects of increasing ambient temperature on the overload protection circuit.

12 Claims, 1 Drawing Sheet

OVERLOAD PROTECTION CIRCUIT USING A NO-TRIM CIRCUIT FOR COMPUTER POWER SUPPLIES

TECHNICAL FIELD

The invention relates generally to the field of computer power supplies and, more particularly, to a method and apparatus for protecting a computer power supply from overload over a wide ambient temperature range using a no-trim circuit.

BACKGROUND

Computer power supplies are experiencing continually increasing demands of high performance, high reliability, and low cost. For example, limits require a computer power supply to shut off if its output exceeds a certain threshold. The power supply should meet these limits over a wide temperature range, such as from 10° C. to 50° C. ambient, and over a wide input voltage range, such as from 90 VAC to 135 VAC. In response to such limits, some power supplies have incorporated temperature-sensitive overload protection circuits. These overload protection circuits shut the computer power supply off before a predetermined maximum rated voltage-current load is exceeded.

A typical overload protection circuit includes a comparator for receiving and comparing a computer supply voltage and a second voltage indicating the current consumption of the computer. A trip point for the comparator can be adjusted to meet the limits by incorporating a variable resistor potentiometer ("pot") between the two voltages. By using a pot, variability from one power supply to the next can be accounted for during the manufacture of the computer. Typically, the pot is adjusted, or "trimmed", by the computer manufacturer to ensure accurate shut offs of the power supply. Once the pot is trimmed, glue is formed over the pot to prevent it from changing during the lifetime of the computer. Although this typical solution has limited success, pots are inherently variable, especially in response to changes in temperature. Furthermore, the trimming and gluing of the pot is an extra step in the manufacture of a computer and therefore is relatively expensive and subject to error.

Therefore, what is needed is an overload protection circuit that allows a power supply to meet certain limits, yet doesn't have the inherent problems associated with pots.

SUMMARY

A technical advance is achieved by an improved overload protection circuit for protecting a computer power supply from overload over a wide ambient temperature range. The improved overload protection circuit, which compares two voltage signals in order to shut off the computer power supply when certain limits are exceeded, is implemented without any pots or other trim circuits. Instead, a resistive temperature device is utilized to counter the effects of increasing ambient temperature on the overload protection circuit.

A technical advantage is that, despite any increase in ambient temperature, an over-current-protection trip point for the overload protection circuit remains near desired levels across most ambient temperatures.

Another technical advantage is that the overload protection circuit does not require any additional handling or trimming during the manufacture of the computer.

DETAILED DESCRIPTION

Figure 1:
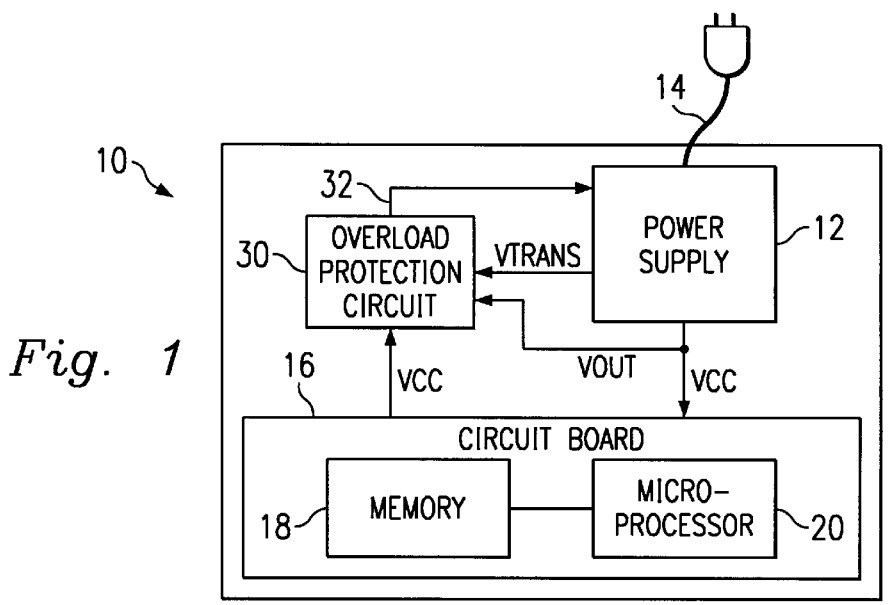
FIG. 1 is a diagram of a computer with an overload protection circuit utilizing features of the present invention.

Referring to FIG. 1, reference numeral 10 generally designates a personal computer. The computer 10 includes a power supply 12, an alternating current "AC" power cord 14, a computer power supply bus VCC, a circuit board 16, and a plurality of computing circuits represented by a memory 18 and a microprocessor 20. The circuit board 16 includes connectors (not shown) that interconnect the plurality of computing circuits 18, 20, and connect the VCC bus to the computing circuits. In operation, the power supply 12 converts AC power received through the power cord 14 into regulated direct current "DC" power. The power supply 12 provides the regulated DC power at a predetermined voltage level, which is driven through the VCC bus to the plurality of computing circuits 18, 20. The plurality of computing circuits 18, 20 utilize the power supplied through the VCC bus to perform conventional computing tasks.

The computer 10 also includes an overload protection circuit 30 for use with the power supply 12. The overload protection circuit 30 receives the VCC bus from the circuit board 16, an output voltage VOUT from the power supply 12, and a transformer voltage VTRANS. The transformer voltage VTRANS is connected to a secondary transformer coil (not shown) of the power supply 12. The overload circuit 30 drives a shut-off signal 32, which informs the power supply 12 that certain predetermined conditions have been exceeded, as described in greater detail below.

Figure 2:
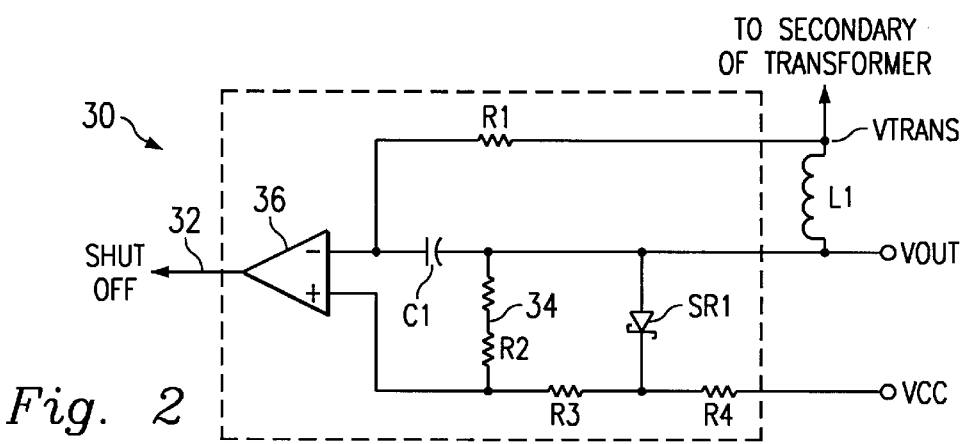
FIG. 2 is a schematic diagram of one implementation of the overload protection circuit of FIG. 1.

Referring to FIG. 2, connected between the power supply output voltage VOUT and the transformer voltage VTRANS is a current sense inductor L1 which reflects a change in current as a change in voltage. In the implementation herein described, the current sense inductor L1 is part of the power supply 12, but alternative implementations may include the current sense inductor with the overload protection circuit.

The overload circuit 30 includes resistors R1, R2, R3, and R4, a capacitor C1, a positive coefficient resistive temperature device ("RTD") 34, a comparator 36 and a shunt regulator SR1. In the implementation herein described, the shunt regulator SR1 is a TL431 manufactured by National Semiconductor Company of Santa Clara, Calif.

The comparator 36 detects when the power supply 12 is overloaded, or above a predetermined voltage-current limit. When such a situation exists, the overload protection circuit 30 reaches an over-current-protection ("OCP") trip point and transitions the shut off signal 32 accordingly, thereby signaling the power supply 12 to power down. In actuality, the OCP trip point overload protection circuit 30 varies somewhat with temperature. However, the variance of the OCP trip point for the overload protection circuit 30 is relatively small.

For the sake of example, representative values will be shown, it being understood that the overload protection circuit 30 may accommodate many different situations. The power supply output voltage VOUT is set at 5 V and the maximum predetermined limit of operation for the power supply 12 is 240 VA. A maximum current for the transformer voltage VTRANS is calculated to be 48 A (48 A=240 VA/5 V), although 45 A is targeted for reasons of reliability. The capacitor C1 is 10 $\mu$F, the RTD 34 is 200 $\Omega$, and the resistors R1, R2, R3, R4 are 10 K$\Omega$, 330 $\Omega$, 22 K$\Omega$, and 2.4 K$\Omega$, respectively. The operating ambient temperature range is 10° C. to 50° C. Variations in current between the transformer voltage VTRANS and power supply output voltage VOUT are due to the resistance of the current sense inductor L1, which increases as ambient temperature increases. The voltage drop across the inductor L1 increases since the resistance of the inductor increases with an increase in ambient temperature, even though the current drawn at VOUT remains constant.

To compensate for the change in resistance of the current sense inductor L1, the resistance of the RTD 34 increases as ambient temperature increases. Hence, the trigger point where the output of the comparator 32 goes to a low impedance is the same for the same output current drawn at VOUT. As a result, despite an increase in ambient temperature, the OCP trip point for the overload protection circuit 30 remains near the 45 A target across most ambient temperatures.

Figure 3:
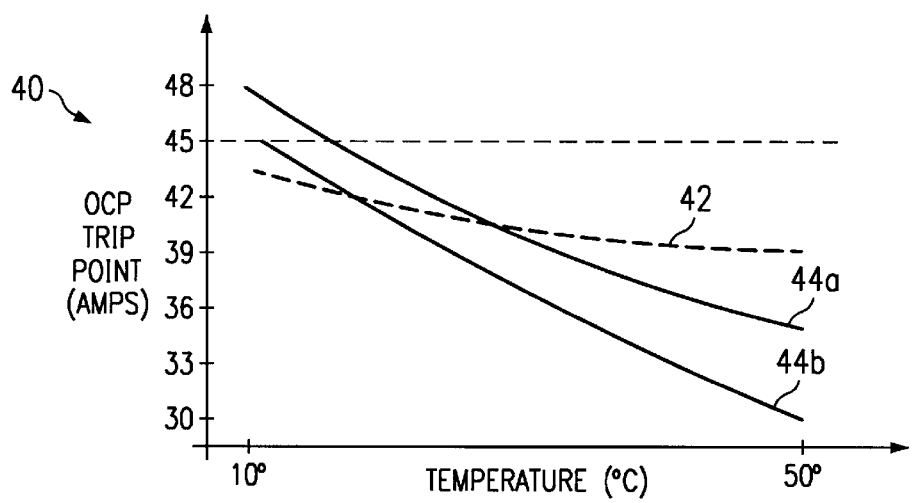
FIG. 3 is a graph of test results comparing the operation of the overload protection circuit of FIG. 2 with a conventional overload protection circuit.

Referring to FIG. 3, to illustrate the benefits of the overload protection circuit 30, its performance will be compared with a conventional overload protection circuit by a graph 40. For the sake of comparison, the conventional overload protection circuit will have the same components as the overload protection circuit 30, except instead of having resistor R2 and RTD 34, the conventional circuit has a 1000 Ω pot properly trimmed. The graph 40 has a horizontal axis designating ambient temperature and a vertical axis designating the OCP trip point for the overload protection circuit. A curve 42 represents the performance of the overload protection circuit 30, while curves 44a and 44b represent the performance of the conventional overload protection circuit. There are two curves 44a and 44b for the conventional overload protection circuit because of the inherently variable nature of the pot, as well as the unpredictable increase in resistance of the current sense inductor L1. It should be noted that the curve 42 is relatively flat, having a low OCP trip point of 39 A at 50° C. and a high OCP trip point of 43 A at 10° C. In comparison, it should also be noted that both curves 44a and 44b have a high OCP trip point of 45 A at 10° C., due to the appropriate trimming of the pot, mentioned above, but have low OCP trip points of 35 A and 30 A, respectively, at 50° C. Those of ordinary skill in the art will recognize that such low OCP trip points are highly undesirable.

It is understood that the invention described herein can take many forms and embodiments, the embodiments described herein are intended to illustrate rather than limit the invention. For example, the overload protection circuit 30 may be simply altered to accommodate a positive thermocouple coefficient device, such device being less expensive than the negative coefficient RTD described above. Furthermore, certain applications that require exact precision for shut off can include additional analog circuitry using on/off transistors switch circuits to shut off the power supply 12 by having separate overload protection circuits for different temperature ranges, the on/off transistors appropriately selecting among the separate circuits according to the ambient temperature. Therefore, variations may be made without departing from the spirit or purpose of the invention. Accordingly, it is appropriate that the appended claims be construed broadly and in a manner consistent with the scope of the invention.

What is claimed is:

1. A computer comprising:
    a power supply including an input for receiving a shut-off signal and an output for driving a first output voltage;
    a device for receiving the first output voltage and producing a second output voltage, the difference between the first output voltage and the second output voltage indicating a change in current at the power supply output;
    a computer supply voltage derived from the first output voltage; and
    an overload protection circuit including:
        a comparator having a first and second input terminal, wherein the computer supply voltage is fed into the first input terminal of the comparator and the second output voltage is fed into the second input terminal of the comparator; and
        a serially connected resistor and resistive temperature device connected between the first and second input terminals of the comparator.

2. The computer of claim 1 wherein the device for producing the second output voltage has a positive coefficient and the serially connected resistive temperature device of the overload protection circuit has a positive coefficient.

3. The computer of claim 1 wherein the overload protection circuit further includes serially connected resistors connecting the first output voltage to the first input terminal of the comparator.

4. The computer of claim 1 wherein the resistive temperature device has the same resistive reaction to temperature as the device for producing the second output voltage.

5. The computer of claim 1 wherein the overload protection circuit further includes resistors serially connected between the computer power supply and the first input terminal of the computer, and a shunt regulator having an anode connected to the second output voltage and a cathode connected between the serially connected resistors.

6. In a computer having at least one computing circuit and a power supply for driving an output voltage for use by the at least one computing circuit, an overload protection circuit comprising:
    a current sensing device for driving a second voltage, the second voltage being proportional to the current drawn by the at least one computing circuit;
    a comparator having first and second inputs, wherein the output voltage is fed into the first input and the second voltage is fed into the second input; and
    a resistive temperature device connected between the first and second input terminals of the comparator.

7. The overload protection circuit of claim 6 wherein the current sensing device has a first resistance and the resistive temperature device has a second resistance, and the first and second resistances provide substantially similar inputs to the comparator for different ambient temperatures.

8. The overload protection circuit of claim 6 wherein the current sensing device has a positive coefficient and the resistive temperature device has a positive coefficient.

9. The overload protection circuit of claim 6 further comprising:
    a resistor serially connected with the resistive temperature device between the first and second inputs of the comparator; and
    a pair of resistors serially connecting the output voltage to the first input of the comparator.

10. The overload protection circuit of claim 9 further comprising:
    a shunt regulator having an anode connected to the second voltage and a cathode connected between the pair of serially connected resistors.

11. In a computer having at least one computing circuit and a power supply for driving an output having an output current and voltage for use by the at least one computing circuit, a method for shutting off the power supply in overload conditions comprising the steps of:

driving a second voltage with a current sensing device, the second voltage being poroportional to the current drawn by the at least one computing current:

feeding the output voltage into a first input terminal of a comparator;

feeding the second voltage into a second input terminal of the comparator; and serially connecting a resistive temperature device and a resistor between the first and second input terminals of the comparator.

12. The method of claim 11 further comprising the step of serially connecting a pair of resistors between the output voltage and the first input of the comparator.

* * * * *